No. 734,916. PATENTED JULY 28, 1903.
A. H. MARKS.
PNEUMATIC TIRE AND RIM.
APPLICATION FILED MAY 2, 1902.
NO MODEL.
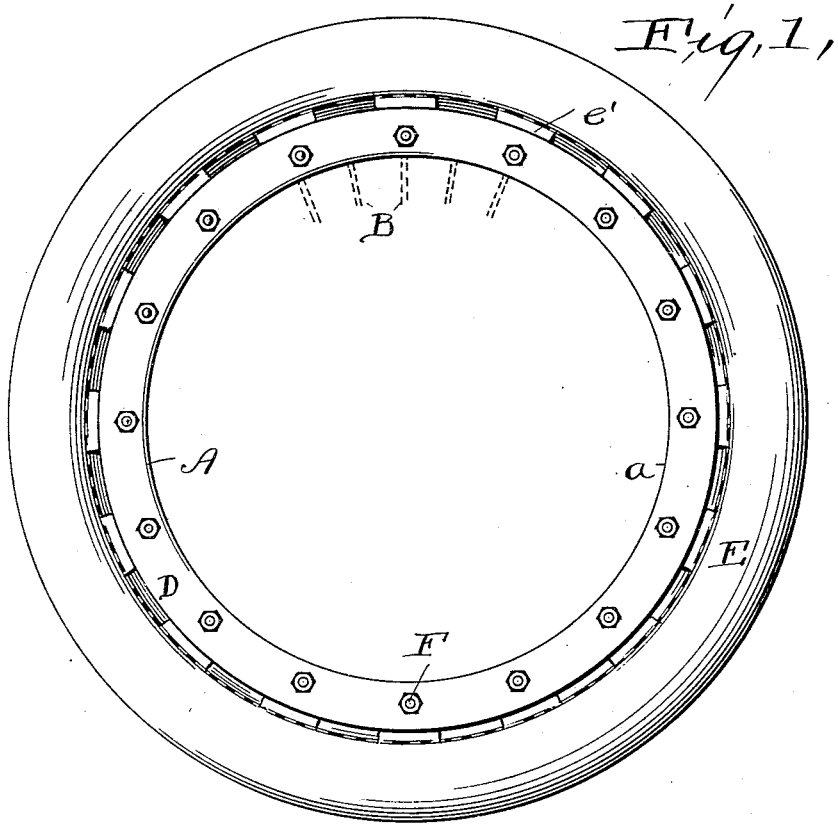
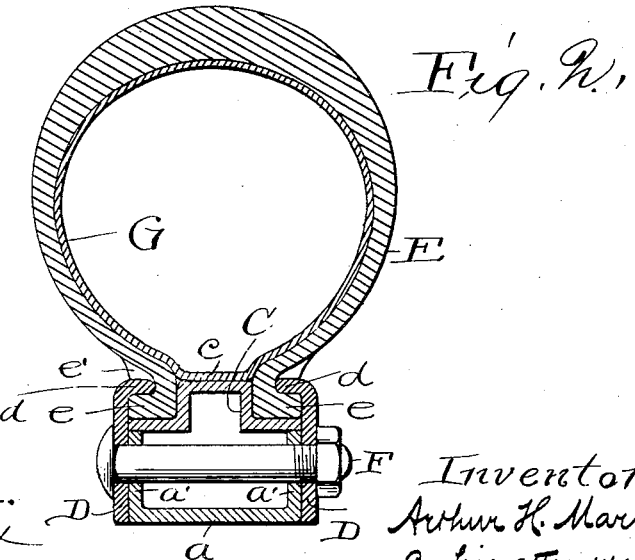
Witnesses:
E. B. Gilchrist
H. M. ___
Inventor:
Arthur H. Marks
By his attorneys
Thurston & Bates No. 734,916.

Patented July 28, 1903.

UNITED STATES PATENT OFFICE.

ARTHUR H. MARKS, OF AKRON, OHIO.

PNEUMATIC TIRE AND RIM.

SPECIFICATION forming part of Letters Patent No. 734,916, dated July 28, 1903.

Application filed May 2, 1902. Serial No. 105,575. (No model.)

*To all whom it may concern:*

Be it known that I, ARTHUR H. MARKS, a citizen of the United States, residing at Akron, in the county of Summit and State of Ohio, have invented a certain new and useful Improvement in Pneumatic Tires and Rims, of which the following is a full, clear, and exact description, reference being had to the accompanying drawings.

The invention relates to double-tube pneumatic tires, and particularly to their combination with a metallic wheel-rim and means for detachably holding the tire on said rim, substantially as hereinafter described, and pointed out definitely in the claims.

In the drawings, Figure 1 is a side view of a wheel embodying my invention. Fig. 2 is a transverse sectional view of the same.

The wheel-rim A is channel-shaped in cross-section, consisting of the substantially cylindrical part $a$, to which the spokes B are fastened, and the outwardly-extended side flanges $a'$ $a'$.

C represents an annular tire made, preferably, of sheet metal which is fitted upon the outer edges of said flanges, spanning the space between them. It has an external circumferential rib $c$ midway between its edges, which rib is of such width that the metal tire on either side thereof is substantially as wide as the beaded edges $e$ of the tire-sheath E.

D D represent retaining-rings which are secured to the sides of the rim A by bolts F, passing through said rings and the flanges $a'$. These rings project beyond the outer periphery of the edges of the metallic tire C, thereby holding it in the described position, and the outer edges of these retaining-rings are provided with inwardly-bent overhanging flanges $d$. The base or edges of the tire-sheath E are provided with external beads which fit the spaces between the rib $c$, the retaining-rings D, and their flanges $d$. These beaded edges of the tire-sheath can be placed, as shown, only by the removal of the retaining-rings; but when the retaining-rings are replaced and secured the edges of the tire-sheath are firmly held.

G represents the inner tube, which is of familiar construction. When inflated, it furnishes a resilient core for the sheath, but has no function whatever in connection with the retaining-tire upon the rim.

On the sides of the sheath just outside of the inwardly-turned edges of the retaining-rings are outwardly-projecting bosses $e'$, which engage with the edges of said retaining-rings, and thereby prevent, in a very large measure, any lateral rolling movement of the tire upon the rim. These so-called "bosses" may be placed at intervals of a few inches, as shown, or they may be merged together into continuous external flanges, as indicated by the dotted lines in Fig. 1.

Having described my invention, I claim—

1. The combination of a trough-shaped metallic rim having outwardly-extended side flanges, an annular metal tire which fits upon said flanges and spans the space between them and is provided midway between its edges with an external circumferential rib, and two retaining-rings bolted to the sides of said rim and extending well beyond the same and provided on their outer edges with inwardly-turned flanges, with a tire-sheath having beaded edges which fit the spaces inclosed by said metal tire, its circumferential flange and said retaining-rings.

2. The combination of a wheel-rim, and two retaining-rings secured against the sides of the rim and having inwardly-turned flanges at their outer edges, with a tire-sheath having beaded edges adapted to be engaged by said overhanging edges and having also on its sides laterally-projecting bosses which engage with the outer edges of said flanges.

3. The combination of the wheel-rim, retaining-rings secured to the opposite sides of said rim and projecting outwardly beyond the same and having inwardly-directed flanges at their outer edges, a tire on said rim having an elevated circumferential portion and spanning the space between said retaining-rings, and a tire-sheath having beads adapted to fit the spaces between the elevated portion of said tire and said ring-flanges and having on its sides laterally-projecting bosses engaging the outer edges of said ring-flanges.

In testimony whereof I hereunto affix my signature in the presence of two witnesses.

ARTHUR H. MARKS.

Witnesses:
E. B. GILCHRIST,
E. L. THURSTON.